(12) United States Patent
Harp

(10) Patent No.: US 10,685,139 B2
(45) Date of Patent: Jun. 16, 2020

(54) SYSTEMS AND METHODS FOR DYNAMIC MASKING OF DATA

(71) Applicant: Idera, Inc., Houston, TX (US)

(72) Inventor: Vicky Harp, Nipoma, CA (US)

(73) Assignee: Idera, Inc., Austin, TX (US)

( * ) Notice: Subject to any disclaimer, the term of this patent is extended or adjusted under 35 U.S.C. 154(b) by 243 days.

(21) Appl. No.: 15/589,568

(22) Filed: May 8, 2017

(65) Prior Publication Data

US 2017/0323119 A1 Nov. 9, 2017

Related U.S. Application Data

(60) Provisional application No. 62/332,757, filed on May 6, 2016.

(51) Int. Cl.

| | |
|---|---|
| *G06F 21/62* | (2013.01) |
| *G06F 21/78* | (2013.01) |
| *G06F 3/06* | (2006.01) |
| G06F 12/0802 | (2016.01) |
| G06F 12/0871 | (2016.01) |
| G11C 7/10 | (2006.01) |

(52) U.S. Cl.
CPC .......... *G06F 21/6254* (2013.01); *G06F 3/065* (2013.01); *G06F 21/78* (2013.01); *G06F 3/0604* (2013.01); *G06F 12/0802* (2013.01); *G06F 12/0871* (2013.01); *G11C 7/1063* (2013.01)

(58) Field of Classification Search
CPC .................................................. G06F 9/4812
USPC .......................... 707/999.01; 710/49; 726/22
See application file for complete search history.

(56) References Cited

U.S. PATENT DOCUMENTS

| 7,437,765 | B2 * | 10/2008 | Elms ...................... G06F 21/83 345/615 |
|---|---|---|---|
| 8,433,688 | B2 | 4/2013 | Vaidya et al. |
| 9,575,903 | B2 * | 2/2017 | Glew .................. G06F 12/1408 |
| 2003/0154341 | A1 * | 8/2003 | Asaro ....................... G06F 3/14 710/306 |
| 2006/0253724 | A1 * | 11/2006 | Zhang ................. G06F 11/1451 714/2 |
| 2007/0124474 | A1 * | 5/2007 | Margulis ................... G06F 3/14 709/226 |

(Continued)

OTHER PUBLICATIONS

United Kingdom Response to Office Action, dated Jul. 9, 2018, UK Patent Application No. 1707333.9, pp. 1-19.

(Continued)

*Primary Examiner* — Baoquoc N To
(74) *Attorney, Agent, or Firm* — Kent B. Chambers; Terrile, Cannatti & Chambers, LLP

(57) ABSTRACT

Embodiments disclosed herein may be useful for controlling access to data, and particularly to data intended for restricted access. In at least one embodiment, a system and method for dynamic data masking intercepts input/output (I/O) read requests for data in external memory, determines if the data to be read should be masked, and appropriately, dynamically masks data before the requested data is written into system memory. The system and method for dynamic data masking provides a technical improvement to computing systems by, for example, avoiding the need to create an entirely separate database with scrubbed data and, thus, resource and costs associated with creating a separate, scrubbed database.

21 Claims, 14 Drawing Sheets

(56) References Cited

U.S. PATENT DOCUMENTS

2011/0004586 A1    1/2011  Cherryholmes et al.
2012/0210119 A1*  8/2012  Baxter .................... H04L 63/08
                                                                  713/150
2015/0128285 A1*  5/2015  LaFever ................. H04L 67/02
                                                                  726/26

OTHER PUBLICATIONS

Search Report under Section 17(5)(b) and Abbreviated Examination Report under Section 18(3) issued by the Intellectual Property Office of the United Kingdom dated Oct. 19, 2017 in Patent Application No. GB1707333.9, pp. 1-5.

* cited by examiner

*Original Database Contents in Backup (502)*

Table: PATIENT

| First Name | Last Name | Social Security Number | Last Login Date |
|---|---|---|---|
| Barbara | Rodriguez | 123-45-6789 | 6/12/2015 |
| Elizabeth | Chen | 234-56-7890 | 12/8/2015 |
| James | Smith | 567-89-0123 | 1/4/2016 |
| John | Johnson | 678-90-1234 | 4/3/2015 |
| Linda | Garcia | 789-01-2345 | 11/5/2014 |
| Mary | Miller | 890-12-3456 | 3/17/2015 |
| Michael | Brown | 901-23-4567 | 1/19/2016 |

*Masked Data As Read from Backup (504)*

Table: PATIENT

| First Name | Last Name | Social Security Number | Last Login Date |
|---|---|---|---|
| B***** | R***** | ###-##-#### | 6/12/2015 |
| E***** | C***** | ###-##-#### | 12/8/2015 |
| J***** | S***** | ###-##-#### | 1/4/2016 |
| J***** | J***** | ###-##-#### | 4/3/2015 |
| L***** | G***** | ###-##-#### | 11/5/2014 |
| M***** | M***** | ###-##-#### | 3/17/2015 |
| M***** | B***** | ###-##-#### | 1/19/2016 |

*Example Masking Formulas (506)*

LEFT([Patient].[First Name],1) & "*****"
LEFT([Patient].[Last Name],1) & "******"
-##-####

Original Table

| Social Security Number | First Name | Last Name |
|---|---|---|
| 123-45-6789 | Barbara | Rodriguez |
| 234-56-7890 | Elizabeth | Chen |
| 567-89-0123 | James | Smith |

— 1302

Masked Table

| Social Security Number | First Name | Last Name |
|---|---|---|
| ###-##-#### | Barbara | Rodriguez |
| ###-##-#### | Elizabeth | Chen |
| ###-##-#### | James | Smith |

— 1304

New Index on Masked Table (Corrupt)

| Social Security Number | Last Name |
|---|---|
| ###-##-#### | Rodriguez |
| ###-##-#### | Chen |
| ###-##-#### | Smith |

| Social Security Number | First Name | Last Name |
|---|---|---|
| 123-45-6789 | Barbara | Rodriguez |
| 234-56-7890 | Elizabeth | Chen |
| 567-89-0123 | James | Smith |

| Social Security Number | Gender |
|---|---|
| 123-45-6789 | Female |
| 234-56-7890 | Female |
| 567-89-0123 | Male |

1402

| Social Security Number | First Name | Last Name |
|---|---|---|
| ###-##-#### | Barbara | Rodriguez |
| ###-##-#### | Elizabeth | Chen |
| ###-##-#### | James | Smith |

| Social Security Number | Gender |
|---|---|
| 123-45-6789 | Female |
| 234-56-7890 | Female |
| 567-89-0123 | Male |

1404

| Social Security Number | First Name | Last Name |
|---|---|---|
| ###-##-#### | Barbara | Rodriguez |
| ###-##-#### | Elizabeth | Chen |
| ###-##-#### | James | Smith |

| Social Security Number | Gender |
|---|---|
| ###-##-#### | Female |
| ###-##-#### | Female |
| ###-##-#### | Male |

1406

| Social Security Number | First Name | Last Name |
|---|---|---|
| 50a1aeff5d8aa34dd.. | Barbara | Rodriguez |
| c057bfdf2033d03a1.. | Elizabeth | Chen |
| 8a5626ec45890b44.. | James | Smith |

| Social Security Number | Gender |
|---|---|
| 50a1aeff5d8aa34dd.. | Female |
| c057bfdf2033d03a1.. | Female |
| 8a5626ec45890b44.. | Male |

SYSTEMS AND METHODS FOR DYNAMIC MASKING OF DATA

CROSS-REFERENCE TO RELATED APPLICATION

This application claims the benefit under 35 U.S.C. § 119(e) and 37 C.F.R. § 1.78 of U.S. Provisional Application No. 62/332,757, filed May 6, 2016, and entitled "SYSTEMS AND METHODS FOR DYNAMIC MASKING OF DATA", which is incorporated by reference in its entirety.

BACKGROUND OF THE INVENTION

Field of the Invention

The present invention relates in general to the field of database systems, and more specifically to systems and methods for dynamic masking of data.

Description of the Related Art

Databases are used to store data in a computer or information handling system, with the data being organized such that the data can be accessed, managed, and updated easily. For example, data may be organized in a structured database such as DB, DB2, SQL Server, Sybase for NT, PostgreSQL, and the like.

The possibility of users gaining access to all the data in a database is a particular concern for database managers and administrators in environments in which the database contains information that should not be available for everyone to access. For example, in a health care database, information may include social security numbers, dates of birth, medical histories and diagnoses, and other personal information. Federal laws prohibit access by unauthorized users, and yet there have been incidents in which authorized users of health care information handling systems have been able to access information about patients (especially celebrities or high profile people) not under their care. Another environment in which unauthorized access to data by authorized users of an information handling system is the development of technology, including defense technology in which information about a program, a project, or a part of a project may be considered sensitive. A program may include multiple projects, and each project may have different parts. There are groups of people who need access to each project or part of a project, but most people should not have access to the data associated with the entire program.

One approach to preventing unauthorized access to information in a database is to protect the database with passwords, levels of security access, or other protocols. However, if a user needs access to any information in the database, the password may allow them to access the entire database. Furthermore, there may be different levels of access needed. For example, system administrators may need access to an entire database to ensure they can fix any issues but do not necessarily need access to the particular data. Basic users (e.g. data entry personnel) may be given very limited rights. Test and production teams may be given intermediate rights to test the database for integrity and meeting storage standards, etc., or may be given rights to implement changes to the database.

Access by test and production teams is less complicated in situations in which all data falls into a specific, sensitive category. However, access to sensitive data is a concern for situations in which development and test teams may want or need access to sensitive data in various indexes in the database. "Sensitive data" is data for which access should be restricted. It should be noted that development and test teams do not necessarily need access to particular data such as particular social security numbers, but the teams might need a large amount of data. This data may be expensive to provide unless actual production data is used. For example, in a health care setting, it may be necessary for a development team to project the number of people in a region that may be grouped in a specific category. As a result of this need for large data, individuals on the development team may have higher database access rights that allow them to service, test, or otherwise access the database at a deeper or broader level. Similarly, test team individuals frequently are able to access sensitive and non-sensitive data because that access is necessary to determine if desired repairs were made, if updates were installed, if changes were successfully implemented, or if the database is otherwise operating correctly. For example, in a health care database, a policy for a group of people may change, and the database will need to change to reflect this change to the policy. The development and test teams will need to implement a change to the database and know if the appropriate changes were made to the database to reflect the change to the policy.

Prior approaches to restricting access of sensitive data by developers and test teams frequently involved "scrubbing" the data, which actually removed the data. This approach has disadvantages, including the difficulty in applying the approach to larger databases, the time needed to scrub a database, and the possibility for the scrubbing process to affect data such that the usefulness of the data is gone as well.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 5 depicts an exemplary, representative output of the dynamic data masking control process of FIG. 2.

FIG. 13 depicts a table creation progression.

FIG. 14 depicts tables with referential integrity issues following a write operation

DETAILED DESCRIPTION

Figure 1:
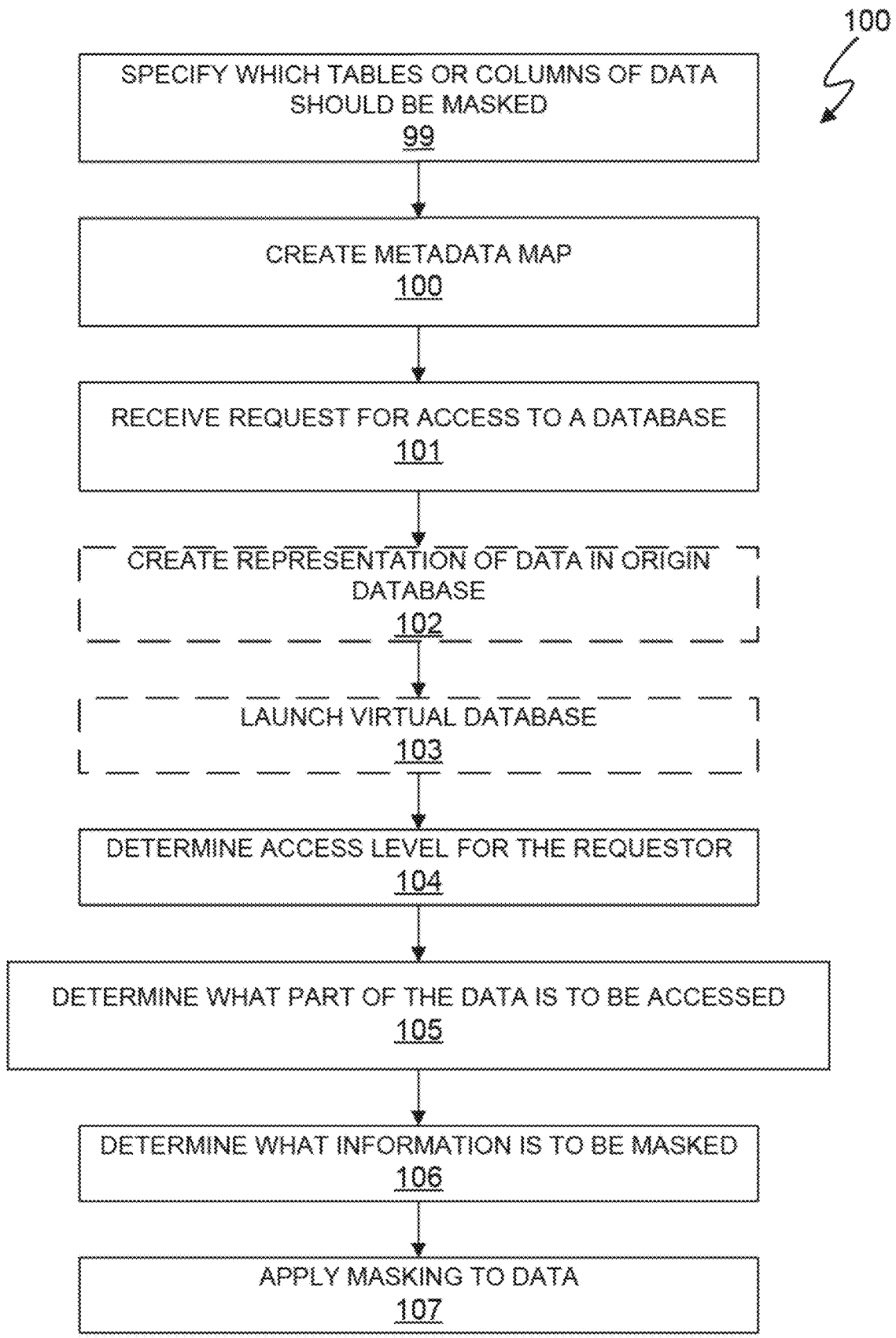
FIG. 1 depicts an exemplary dynamic data masking process.

Embodiments disclosed herein may be useful for controlling access to data, and particularly to data intended for restricted access. In at least one embodiment, a system and method for dynamic data masking intercepts input/output (I/O) read requests for data in external memory, determines if the data to be read should be masked, and appropriately, dynamically masks data before the requested data is written into system memory. The system and method for dynamic data masking provides a technical improvement to computing systems by, for example, avoiding the need to create an entirely separate database with scrubbed data and, thus, resource and costs associated with creating a separate, scrubbed database. Such avoidance of creating a separate, scrubbed database allows a data processing system to function more efficiently. Additionally, in at least one embodiment, the system and method for dynamic data masking is instantiated and operates external to and independent of a database system application, such as SQL server or any other database system application. Thus, masking of data by the system and method for dynamic data masking is transparent to the database system, and the database system does not have to be altered to accommodate use of the system and method for dynamic data masking. Also, in at least one embodiment, the system and method for dynamic data masking masks data in a non-destructive process that preserves the original data that is subsequently masked and does not replace the original data in mass storage memory, such as a hard disk drive, persistent flash memory, or other external storage.

In at least one embodiment, to determine whether to dynamically mask requested data, the system and method for dynamic data masking creates one or more masking metadata maps (referred to herein interchangeably as "metadata maps" or "masking metadata maps") of the database that (i) allows the system and method to dynamically determine whether an intercepted I/O data read request is requesting data that should be masked and (ii) specifies the type of masking to be used, such as insertion of unique characters for each record or simply obscures the data in any desired manner. Multiple metadata maps can be created for multiple levels of access.

In at least one embodiment, the system and method for dynamic data masking intercepts a request to read data from a database, determines if the request includes a request for data to be masked, copies pages of original data from a database into a memory space allocated to the system, masks data in accordance with the masking metadata map, and then provides the masked data to the I/O system of the database system to copy into allocated main memory, such as a buffer cache reserved for the database system.

Embodiments disclosed herein allow users to use the contents of a database without violating rules, such as confidentiality rules, associated with the database in terms of data access. Entities often use data for testing various applications. However, often the test data is fictitious and generated only for testing purposes. Generation of the test data can be expensive and may not accurately represent actual data. Utilizing actual production data for testing, such as data compliance testing, is beneficial but often cannot be used because of, for example, confidentiality concerns. In at least one embodiment, a dynamic data masking process and system protects confidentiality of actual data while preserving features of the actual data that are useful for purposes such as testing or aggregated data statistical analysis. For example, in at least one embodiment, the dynamic masking process and system allow a development or test team to use full production data to make changes to the underlying database, test data for compliance with new rules, etc., without affecting or accessing the original data.

US Patent Publication No. 20110004586 describes an exemplary creation, access, and use of a virtual database. US Patent Publication No. 20110004586 describes exemplary embodiments of database server 16 (FIG. 3) and virtual database software 24 except for the implementation and functionality of the dynamic data masking process 100 and dynamic data masking system 38. A virtual database allows users to view and access data in a way that does not need to copy and duplicate the data in the original database. Idera's SQL Virtual Database is one example of a virtual database that allows users to access the data in a database. A description of the Idera Virtual Database may be found in US Patent Publication No. 20110004586 (referred to herein as the "586 Application") and an extension of the Idera Virtual Database may be found in U.S. Pat. No. 8,433,688. US Patent Publication No. 20110004586 and U.S. Pat. No. 8,433,688 are both incorporated herein by reference. In at least one embodiment, the dynamic data masking process 100 and dynamic data masking system 38 work in conjunction with the virtual database described in US Patent Publication No. 20110004586 to dynamically mask data read from a data file, such as a data backup file.

Figure 3:
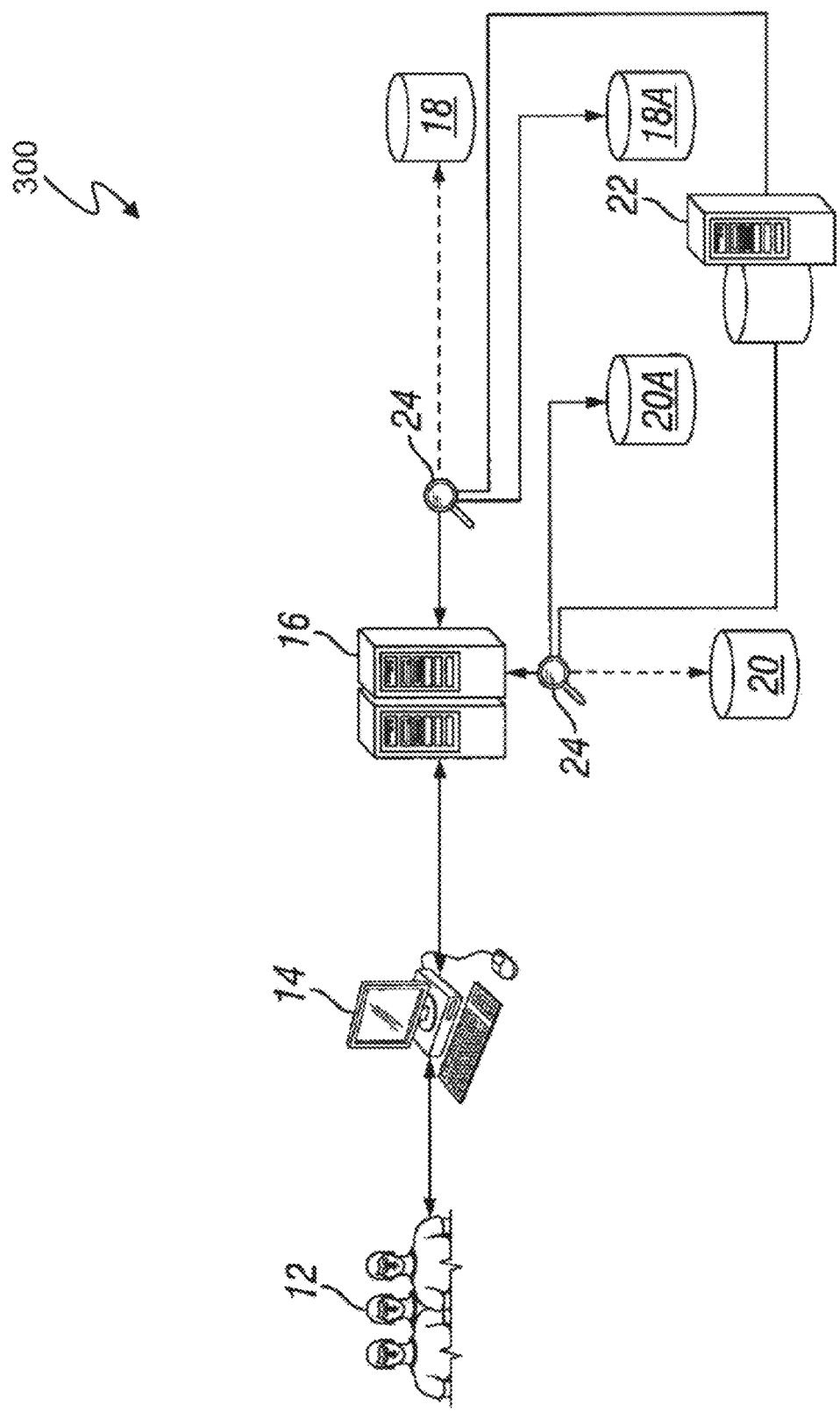
FIG. 3 depicts an exemplary virtual database server.
Figure 4:
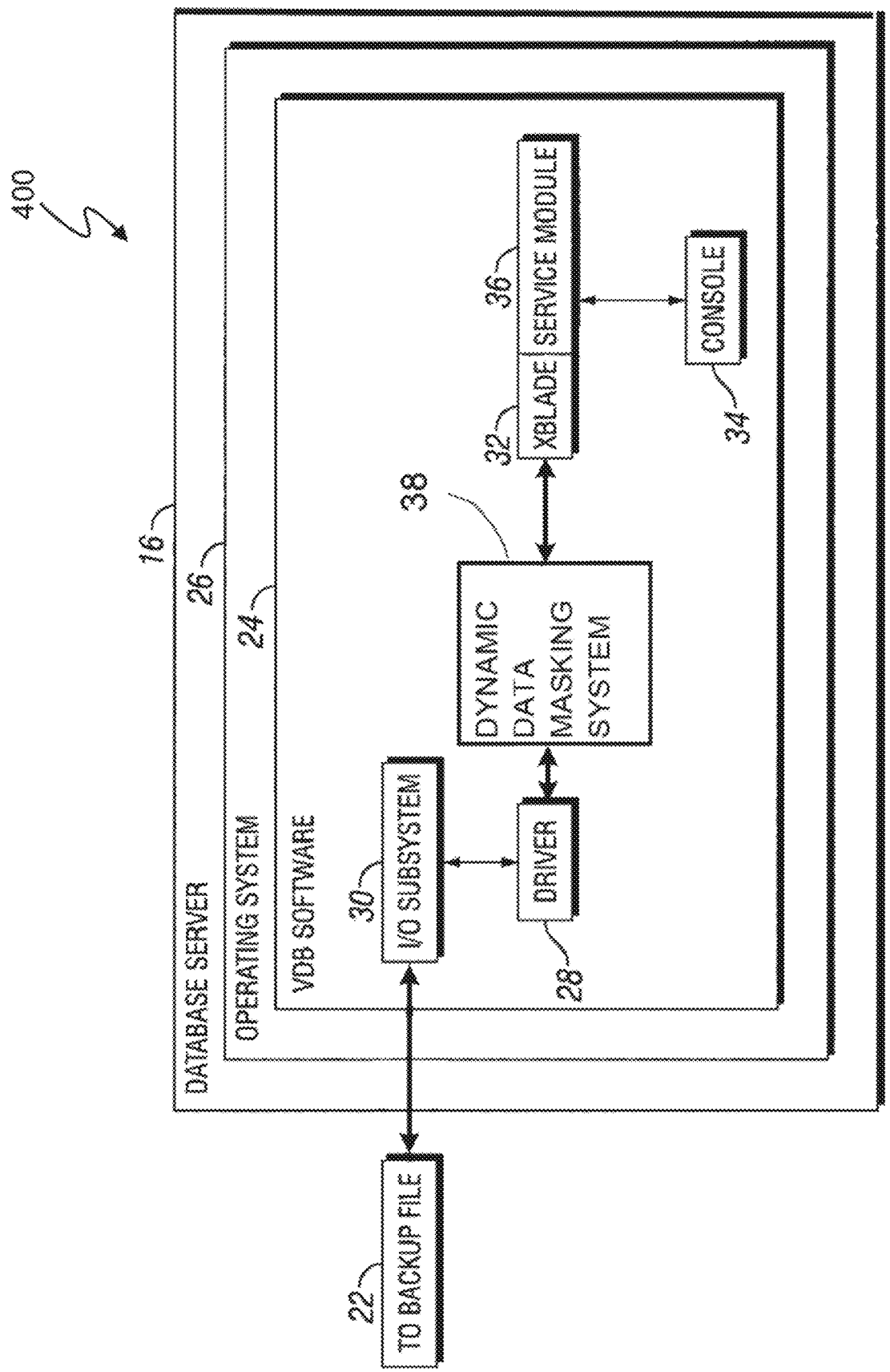
FIG. 4 depicts an exemplary virtual database server system that includes a dynamic data masking system.

FIG. 1 depicts a flow diagram of an exemplary dynamic data masking process 100. FIG. 3 depicts an exemplary network system 300 that includes a database server 16 with a virtual database software system 24. The virtual database software system 24 includes a dynamic data masking system 38 to perform the dynamic data masking process 100. Referring to FIGS. 1, 3, 4, and 4, in at least one embodiment, the dynamic data masking process 100 begins at step 99, in which a first user using a computer in communication with the database server 16 specifies specific columns of tables, etc., for masking in a database. The database can be, for example, an origin database or a virtual database. An origin database is a database where data is originally stored, and the representation of data can be any representation, such as data stored in or as a backup file 22, a generic file system, a data container, a virtual machine snapshot, virtual disk, or as the origin database in a mass storage memory. "Mass memory" refers to persistent memory used to store data including one or more databases.

In step 100, a user creates a metadata map to control masking by the dynamic data masking system 38 by, for example, entering masking criteria via console 34. The metadata map can be any type file, such as a text file or XML file, that can be read by the dynamic data masking system 38. In at least one embodiment, the metadata map contains the specification of which tables to mask by including table object names and page identifiers (page ID's), page types, table schema information including column names and column types, and a masking technique. Creation of an exemplary metadata map is subsequently described in more detail.

In step 101, the database server 16 receives a request from a computer system 14 of a user to access to data stored in the data file 18. The request may be a stand-alone request or part of another program or process.

In step 102, the database server 16 creates a representation of data, such as the backup file 22, having a copy of the data, using traditional backup processes or proprietary processes such as described in the '586 Application. Step 102 is an optional process because some embodiments of dynamic data masking system 38 do not use a representation of the data in the origin database. Additionally, in at least one embodiment, is actually performed before step 99.

In step 103, the database server 17 optionally launches virtual database software 24 to create a virtual database. The virtual database may be launched based on the backup file 22 instead of the original database. Thus, the original database data files 18 may be attached to the backup file 22, which allows users to access the data in the data files 18 without needing to fully restore the data files 18.

In step 104, the database server 16 determines access rights to the data files 18 for the user. Step 104 may include determining a computer or a location associated with the user to determine access rights. For example, a user wanting to access the database using a laptop at their home location might be granted lower access rights than the same person using the same laptop at an office location. Similarly, a user wanting access from an unsecured computer might be granted lower access rights than a user on a secured computer.

If the request for access is approved, then in step 105 the database server 16 determines which tables, pages, columns, etc. of the data the user is allowed to access. In some embodiments, the determination may be made based on the request received in step 101. In other embodiments, a user may be allowed to specify what portion of the data is to be accessed, including data deemed to be sensitive. For example, a user associated with a health care database may want to query all people living in a selected city or state due to changes in laws associated with health care in those areas, or the user may want to query a database for all people having a certain condition, being treated with a certain protocol, under a certain doctor's care, or some other criteria. As another example, a database may include technical information about a project that a company may want to share with various vendors, with each vendor needing to access a portion of the data.

In step 106, the dynamic data masking system 38 determines what information is to be masked based on the access rights of the requesting user and rules, such as confidentiality rules configured in the dynamic data masking system 24. For example, a test team might need to have access to the data to determine if a change has been implemented, whereas a development team may want access to the data to see if a particular change needs to be implemented. Masking for the test team may be different than masking for the test team. As another example, the test team and the development team may both request information on how many people went to a hospital. The test team might be concerned with accessing the data only to ensure that the number of people who went to any hospital are counted, thereby verifying that appropriate query parameters are in place. The development team might be concerned with accessing the data to see which age group(s) of people went to the hospital to ensure the hospital is better equipped to handle that age of people. Each of these groups need to access information for the same group of people, but for different reasons. Accordingly, the masking (if any) for a particular set of data may vary among users. Embodiments may also take into account other criteria to determine what information should be masked. For example, the number of people in a rural area is less than the number of people in an urban setting. In these situations, embodiments may use zip code information to determine that the data contains information about people in rural environments and apply masking to that portion of the data, including applying different masking, to ensure data about people in the rural environments is not compromised.

The functional and logical positioning of the dynamic data masking system 38 is a matter of design choice. In at least one embodiment, the dynamic data masking system 38 is functionally positioned between the driver 28 and the xblade 32. In this embodiment, the dynamic data masking system 38 performs data masking after the driver 28 retrieves data, and then the dynamic data masking system 38 passes the masked data to the xblade 38. In at least one embodiment, the dynamic data masking system 38 is functionally positioned between the driver 28 and the I/O subsystem 30. In this embodiment, the dynamic data masking system 38 performs data masking after the I/O subsystem 30 retrieves the data, and then the dynamic data masking system 38 passes the masked data to the driver 28.

In step 107, the dynamic data masking system applies a mask to the data. FIG. 5 depicts exemplary masking of database contents 502 to generate the masked data 504 using the exemplary masking formulas 506. Masking may be performed to prevent users from viewing the data or to prevent users from analyzing the data. Masking may involve replacing the existing data with garbage, replacing the data with symbols, encrypting the data, or hashing the data. Replacing the existing data with garbage may include displaying random graphics, including grayscale graphics or random patters. Replacing the existing data with symbol may include using symbols based on the data. For example, replacing a social security number with symbols may look like "# # #-# #-# # # #" such that a user knows the data consists of numbers, whereas replacing an address with symbols may look like "# # # # ABCDEFGH" such that a user knows the data consists of numbers and letters. Masking data may also include encryption. Encryption may ensure that even if the data is communicated to a user outside a secure network, the data cannot be analyzed to bypass any masking. Data may also be hashed, using industry standard algorithms such as SHA-256. In step 107, the data is masked dynamically such that as the virtual database software system 24 retrieves the data, the dynamic data processing system 38 processes the retrieved data and applies the masking formulas to mask the data. Thus, if two or more users are wanting to use the same data, the data can be masked differently and independently for the different users, based on the different computers, based on distinct environments, etc. Also in step 107, the masking may be deemed permanent, such that export of the data will still not enable a user to view or access the data. In some embodiments, the masking may be hardened if the data is to be exported. In other embodiments, all masking is hardened to ensure the data cannot be viewed or accessed even if the data is not exported. It should be noted that a virtual database may still read masked or encrypted data to allow a user to work with the data.

Note that in the method illustrated in FIG. 1, in at least one embodiment, there is no possibility for a user to gain access to the masked data.

Figure 2:
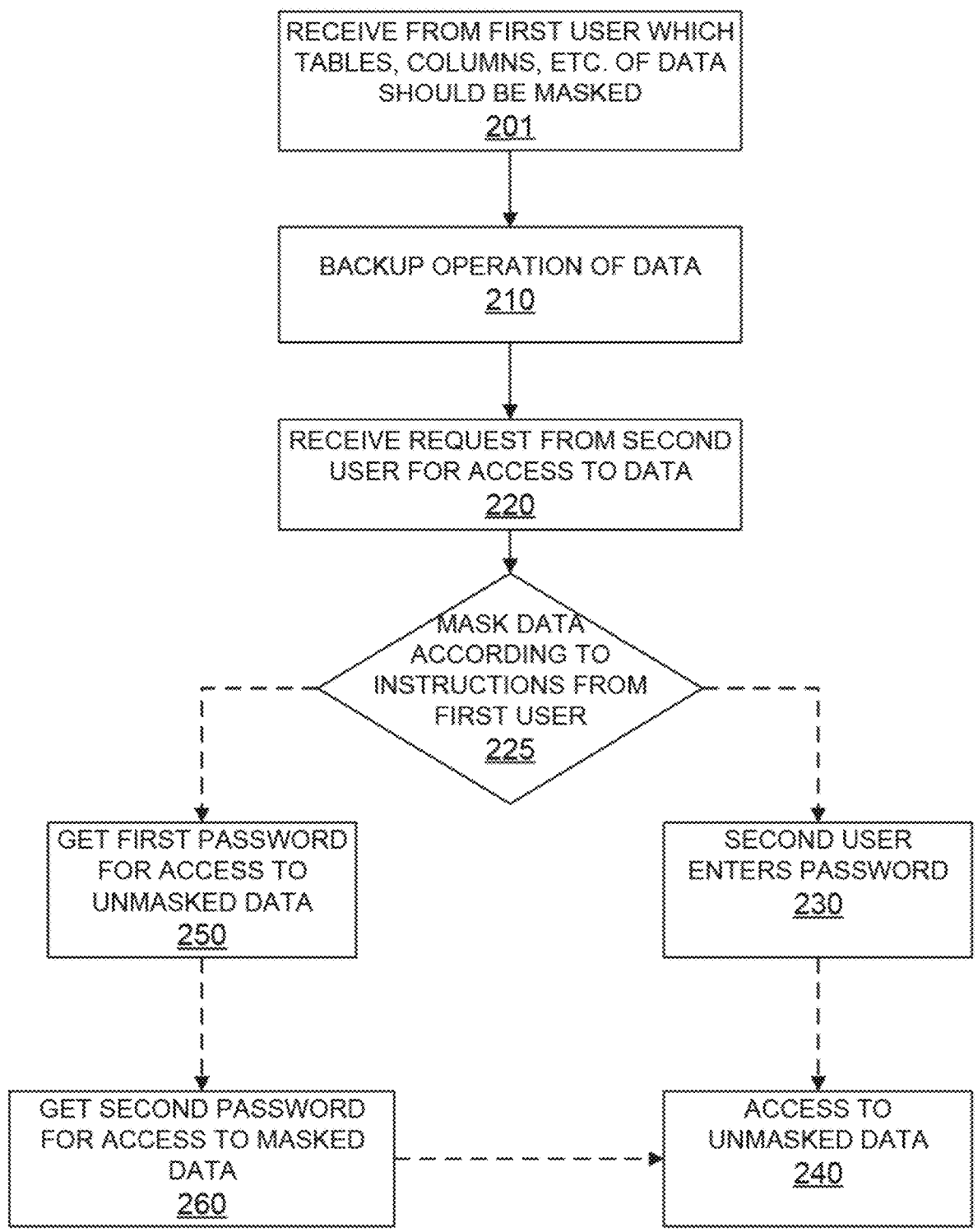
FIG. 2 depicts an exemplary dynamic data masking control process for controlling masking of data in a database.

FIG. 2 depicts a flow diagram of an exemplary dynamic data masking control process 200 for controlling masking of data in a database. In step 201 of method 200, a first user specifies which tables, columns, etc. of data should be masked.

In step 210, a backup operation of the database is performed. A backup operation may include storing a copy of the database in memory so it may be used to restore an information handling system in case of a data loss event, including data deletion or corruption.

In step 220, a request may be received requesting access to the data or a portion of the data stored in a database. In step 225, when a request for access by a second user is received for the data, all data is masked according to the instructions provided by the first user.

In step 230, the second user may identify a password which unmasks all the data and allows access to unmasked data in step 240. The unmasked data may include all or a portion of the original data. For example, an emergency room physician may need to access data for urgent care of a patient.

Alternatively, in steps 250 and 260, data may be encrypted or otherwise masked and require two passwords. A first password may allow the database to be restored and for access to unmasked data via a virtual database. A second password may allow the data to be mounted by a virtual database and also allows access to masked data in step 240. The database may or may not be restored. When a user mounts the database using a virtual database, only the data that corresponds to the password is visible or accessible.

Embodiments disclosed herein may be performed by an information handling system, which generally includes a processor, a memory communicatively coupled to the processor and a set of instructions stored in the memory and executable by the processor.

As previously mentioned, FIG. 3 depicts an exemplary virtual database server 300. As depicted in FIG. 3, a location of backup file 22 has been repositioned and virtual database software ("VDB") 24, according to an exemplary embodiment of the present invention, has been installed onto database server 16. Also, in this exemplary embodiment, database server 16 is a Microsoft® SQL Server™. VDB software 24 described herein may be recorded on a computer-readable recording medium such as a CD-ROM, a floppy disk, or a digital versatile disc (DVD), in an installable or executable file format. Thereafter, VDB software 24 may be read out from the recording medium on database server 16 and loaded on a main memory to be executed, whereby the respective modules of VDB software 24 are realized on the main memory.

Here, user 12 initiates a transaction via PC 14, which submits a TSQL command to database server 16 to retrieve data. Once database server 16 receives a request, it initiates retrieval of the data from data file 18 and log file 20. However, VDB software 24, installed on server 16, intercepts the request, remaps and reroutes it instead to the corresponding data location in the backup file 22. Those ordinarily skilled in the art having the benefit of this disclosure realize there are a variety of interception methods such as, for example, an operating system filter driver/API detours etc.

During the interception, however, database server 16 still thinks it is calling data file 18 and log file 20. As such, a new database instance may be created on database server 16 using the data contained in backup file 22. Server 16 is unaware the new "virtual" database's data and logs are initially being primarily sourced from the backup file 22 and, hence, allows user 12 to immediately use the virtual database as if it was a normal database. Therefore, the data in backup file 22 is immediately available for use by database server 16 without a restore copy phase first having to take place.

As previously mentioned, FIG. 4 depicts an exemplary virtual database server architecture 400 of database server 16 having a virtual database (VDB) software system 24. In at least one embodiment, the database server architecture of database server 16 is implemented in software, stored in a non-transitory, computer readable storage medium, and executed by a data processor. In terms of basic hardware architecture, database server 16 may be, for example, a Microsoft® SQL Server™ including one or more processors in a processor core and a suitable amount of addressable memory as understood in the art. Database server 16 also includes operating system ("OS") 26, such as one of the many Windows® programs from Microsoft Corporation. Database server 16 also includes a network communication protocol layer (not shown) that implements the necessary functions for communication over a network, as understood in the art.

Database server 16 further includes VDB software system 24 according to an exemplary embodiment of the present invention. In at least one embodiment, VDB software system 24 is a layer of the database server 16 and is located, for example, physically coextensively with the database server 16 in the same computer system or physically installed in a different computer system in communication with the database server 16 and, thus, remotely located from the database 16. The VDB software system 24 includes a console 34, service module 36 and an I/O filter driver/message interceptor 28. Filter driver 28 sits at a low level monitoring disk I/O requests made by database server 16. In this embodiment, there can only be one instance of the filter driver 28 on the target database server 16.

Figure 6:
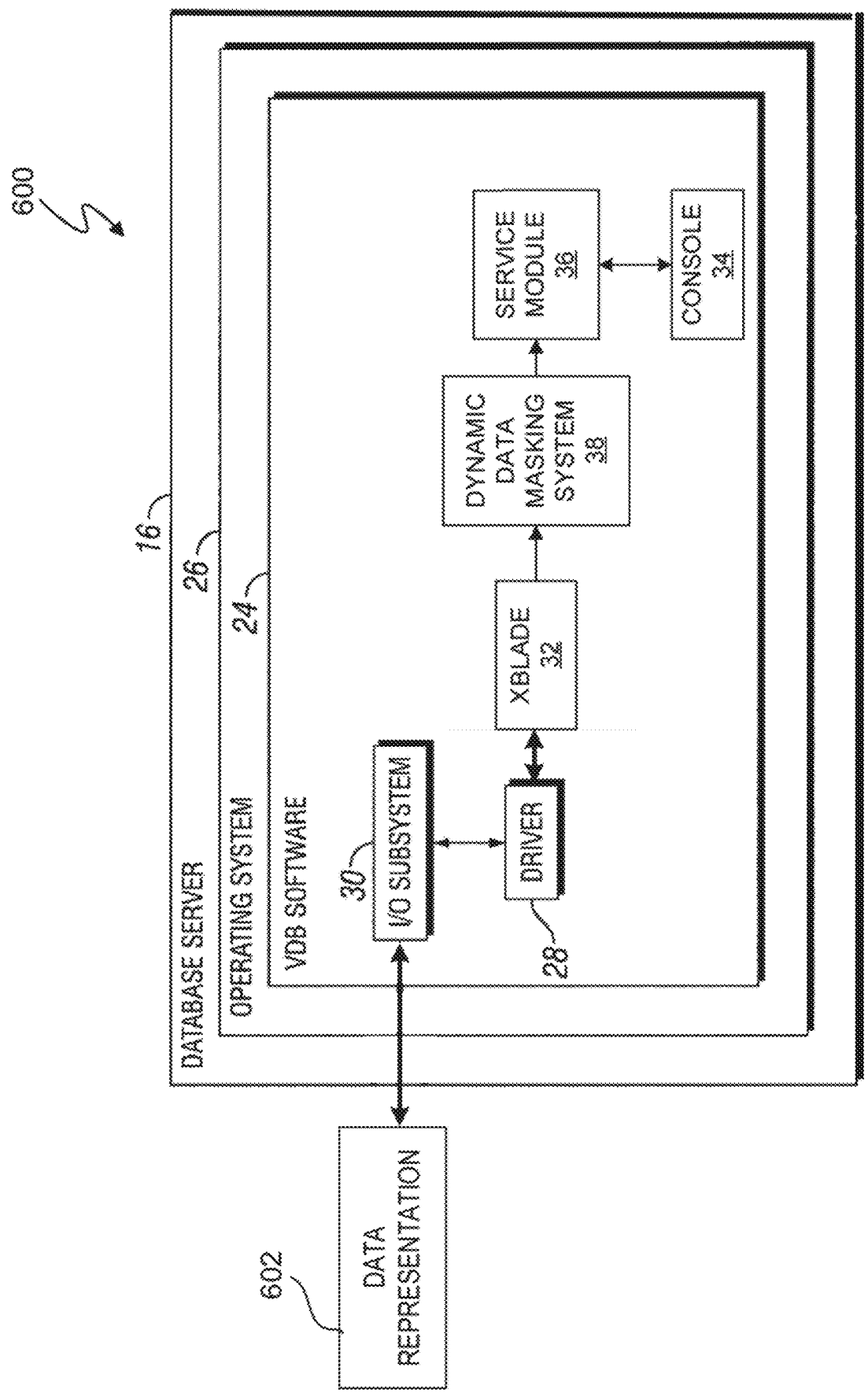
FIG. 6 depicts an exemplary virtual database server system with a dynamic data masking system.

FIG. 6 depicts an exemplary virtual database server system 600. In at least one embodiment, virtual database server architecture 600 functions in the same manner as virtual database server architecture 400 except that the dynamic data masking system 38 intercepts I/O traffic, such as database read requests, from the xblade 32, and, thus, the dynamic data masking system 38 is logically positioned between the xblade 32 and the service module 36. Additionally, in virtual database server architecture 600, the backup file 22 of virtual database server architecture 400 is replaced by data representation 602 to indicate that the I/O subsystem 30 can interact with any type of data representation for subsequent processing by the dynamic data masking system 38.

Figure 7:
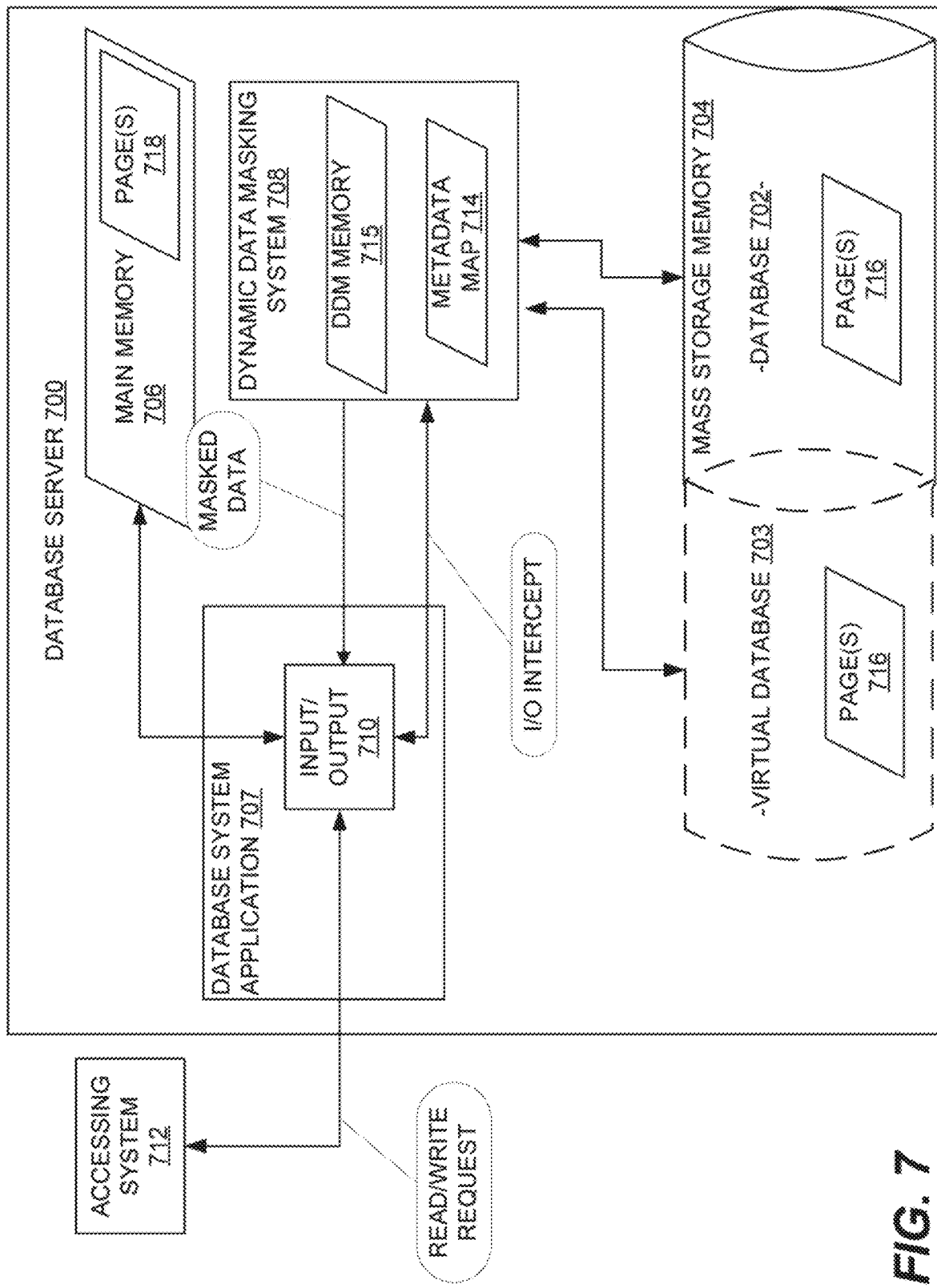
FIG. 7 depicts a database server that can dynamically enhance data security by masking selected data.

FIG. 7 depicts a database server 700 that, in at least one embodiment, dynamically enhances data security by masking selected data in transit from a non-virtual database 702 or an optional virtual database in a first memory, such as mass storage memory 704, to a second memory, such as main memory 706. In at least one embodiment, the database server 700 is a computer system that includes and executes a database system application 707, such as SQL server. The database system application 707 includes an input/output subsystem 710 (referred to herein as "I/O system 710"). In at least one embodiment, the dynamic masking system 708 operates independently of the database system application 707 and is transparent to the database system application 707. "Main memory" refers to memory that is generally volatile, internal to a database server system, and provides data to a processor faster than mass storage memory. The database server 700 includes a processor (not shown) that also executes dynamic data masking system 708. Dynamic data masking system 38 represents an embodiment of dynamic data masking system 708. The dynamic data masking system 708 is logically coupled between I/O system 710 and the database 702 to intercept I/O requests to read or write data to database 702.

When the database server 700 receives a request to read data, the request specifies the data to be read. However, due to the faster data access time from main memory 706 compared to mass storage memory 704, it is slower for database server 700 to search for and only retrieve the data responsive to the read request from database 702 (or optional virtual database 703) in mass storage memory 704. Accordingly, the database 702 (and optional virtual database 703) is organized into pages 716. The database system application 707 requests the pages 716 through the I/O system 710 that are responsive to the read request. Assuming the requested data is not located in main memory 706, the database server 700 responds to the read request by sending an I/O request to copy each page of database 702 that contains data responsive to the read request to the main memory 706. However, transparent to the database system application 707, the dynamic data masking system 708 intercepts the request and, in at least one embodiment, copies the pages 716 that include data responsive to the request to dynamic data masking (DDM) memory 715. In at least one embodiment, the dynamic data masking system 708 intercepts the request as, for example, described in the '586 Application, and, as subsequently described in more detail, determines, in accordance with the metadata map 714, if the read request includes data to be masked prior to permitting access to the data. If the read request includes data to be masked prior to permitting access to the data, the dynamic data masking system 708 determines which portion of requested data to mask and masks the portion of the copied pages in accordance with the metadata map 714 and returns the pages with masked data to input/output 710. Input/output 710 then stores the masked data as pages 718 in main memory 706. In at least one embodiment, the dynamic data masking system 708 determines, in accordance with the metadata map 714 whether the read request includes data to be masked without first copying pages responsive to the request to the DDM memory 715.

Database server 700 then processes the pages 718 copied to main memory 706 to retrieve the specific data responsive to the read request. The virtual database 703 is optional and, in at least one embodiment, is created as previously described in connection with step 103 of FIG. 1. References to "database 702/703" indicates a reference to both databases 702 and 703 together or individually. The DDM memory 715 can be any memory and, in at least one embodiment, is part of the main memory 706 that is allocated to the dynamic data masking system 708.

The metadata map 714 allows the dynamic data masking system 708 to determine which, if any, pages 716 contain data to be dynamically masked and to determine the type of masking. The metadata map 714 is shown as a reference file accessible to the dynamic data masking system 708. The location and specific organization of the metadata map 714 is a matter of design choice provided that the dynamic data masking system 708 can access the metadata map 714 as part of a dynamic masking process. In at least one embodiment, the metadata map 714 is stored in the main memory 706.

Figure 8:
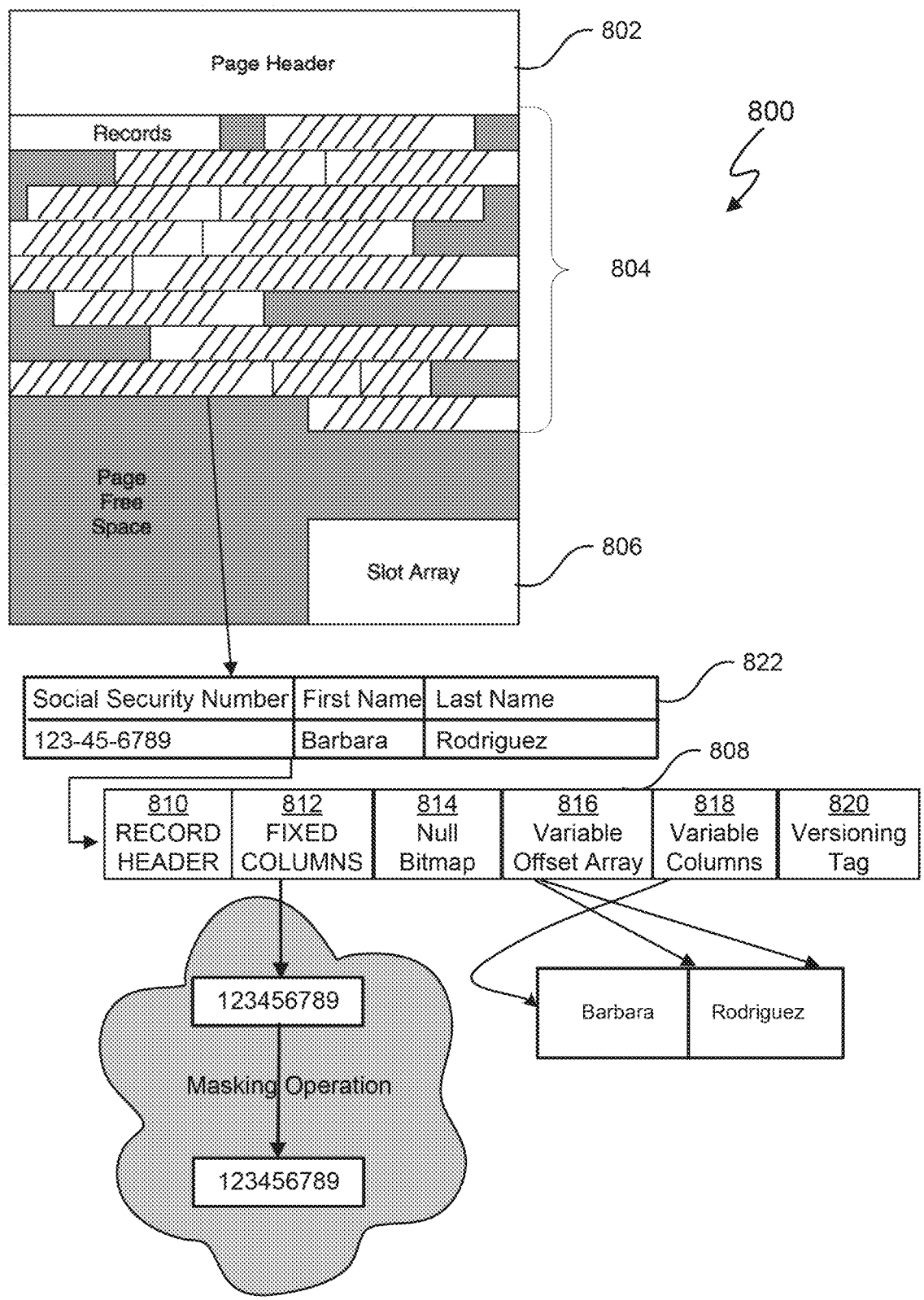
FIG. 8 depicts an exemplary SQL server page.

FIG. 8 depicts an exemplary SQL server page 800, which represents a generic embodiment of each of pages 716 and 718. Page 800 is an 8 kB block that includes a 96 byte page header 802, which contains information including descriptors of the page type, a unique page identifier, and linkage data to previous and next pages in the database 702/703, followed by an 8096 byte space reserved for records 804 (indicated with cross hatching), and a slot array 806. The slot array 806 is an array of two byte pointers to the records 804 in the 8096 byte record space. Any remaining space of the page 800 is free space, which is space not used for records. This internal structure is widely documented and known in the art.

Record structure 808 represents the structure of each record 804. The record data structure varies somewhat depending on the version of SQL Server. In general, the record structure 808 includes a Record Header 810 that includes metadata including a record type followed by a pointer to a section of the record called the Null Bitmap 814. The Null Bitmap 814 includes a 2 byte count of the number of columns in the record 808 followed by a variable number of bytes, with each bit corresponding to one column of a record. A value of the bit in the Null Bitmap 814 indicates whether the column corresponding to the bit is NULL or not. Between the Record Header 810 and the Null Bitmap 814 there is a span of fixed column data 812 representing the contents of columns with a fixed data type (such as numeric types, date types, and fixed character length types like "char(10)"). A social security number is an example of a fixed character length. Following the Null Bitmap 814 is a Variable Offset Array 816 whose value indicates a number of columns that have a variable length (such as "varchar(10)") along with the offsets to the end of each column value that describe the number of bits allocated to the contents of the Variable Columns 818, which follows the segment allocated to the Variable Offset Array 816 First names and last names, such as Barbara Rodriquez, are examples of variable column data. The last segment of the record 808 is a Versioning Tag that indicates a version of the Record 808. Record 808 may also include other data, such as pointers to another page that contains overflow data when data values are too large to be stored in a single page. Table 822 includes three columns representing a fixed column (Social Security Number) two variable columns First Name and Last Name.

Figure 9:
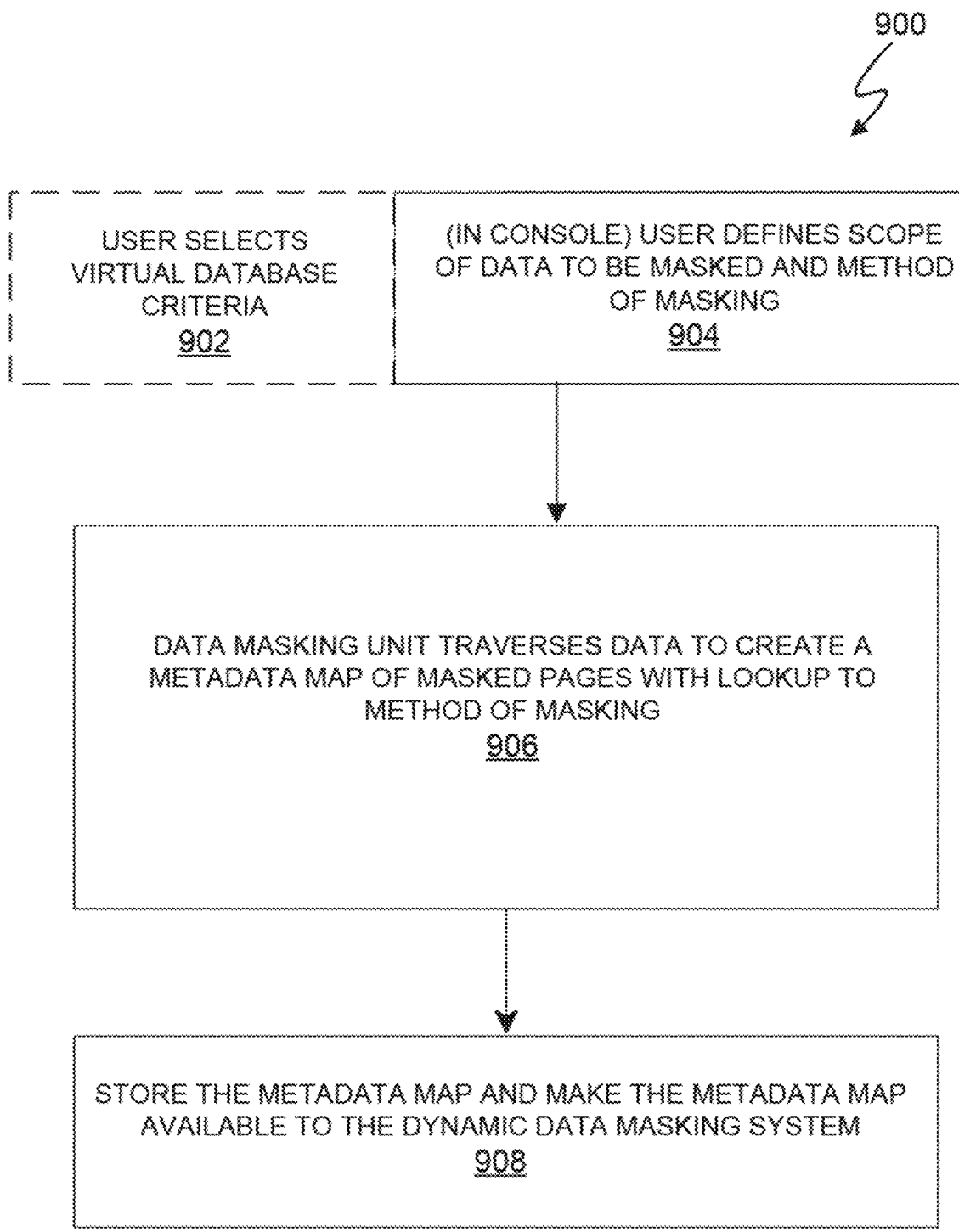
FIG. 9 depicts a metadata map creation process.

FIG. 9 depicts a metadata map creation process 900. As previously described, in at least one embodiment, the database server includes a metadata map 714 that allows the dynamic data masking system 708 to determine which if any pages contain data to be dynamically masked and determine the type of masking. As previously described, data in SQL Server is organized into units called pages 800 (FIG. 8). When an I/O request for a page or data in a page is intercepted, that request does not include metadata about which object the particular requested data page is associated. So, in at least one embodiment, the masking criteria (also referred to as "masking definitions") are applied at a level to identify data within the page itself. Since it is impractical to expect a user to know the individual page IDs of the data to be masked, metadata map creation process 900 creates a metadata map 714 (FIG. 7) that enables the dynamic data masking system 708 to translate logical names (object names and their associated indexes and columns) into the physical page IDs which will be used during dynamic data masking.

An exemplary metadata map can be instantiated in any manner such as a string or table. The exemplary string below represents an exemplary metadata map schema with exemplary data fields:

Security_Level.Object_Name.Page_Type.Page_ID
[range].Column_Name[range].
Column_Type[range].Masking_Method[range]

The optional Security_Level field represents the level of security to which the metadata map applies. In at least one embodiment, the dynamic data masking system 38 masks different sets of data based on a level of security of a user. The level of security is tracked by the dynamic data masking system 38 or an internal service of a data processing system. For example, the security level can be mapped to a user ID and associated password. For example, a first a level 0 Security_Level access could mask N columns of data, a level 1 (less access) access could mask M column(s) of data, and so on, where N and M are positive integers, and M is greater than N.

The Object_Name field identifies a particular table, such as a Patient table.

The Page_Type field identifies a type of page of data. As subsequently described in more detail, databases group data by pages, and each page has a particular type, such as an index, data, or text with a pointer to an associated page.

The Page_ID[range] field identifies the range of page ID's for which masking will apply. The range can be any range, such as all, a continuous or discontinuous range of ID's.

The Column_Name field identifies the name of the columns within a range of columns to be masked. The range can be any range, such as all, a continuous or discontinuous range of ID's.

The Column_Type field specifies the type of column, which provides information on locating the column within a page. For example, a column type, such as CHAR(10), indicates that the column is 10 characters wide, which can be used as an offset to locate the column in the page of data.

The Masking_Method field indicates that masking technique or other method to be used by the dynamic data masking system 38 to mask the data in the pages. Exemplary masking methods include replacing one or more characters with (i) a fixed character, such as a # sign, (ii) a random but unique set of characters, (iii) an encryption or hash algorithm to apply and replace the one or more characters. The masking method also specifies how many characters in a column the dynamic data masking system 38 will mask. For example, the masking method could specify that all characters are masked, the first, middle, or last X characters are masked (where X is an integer), or any other set of characters.

Referring to FIG. 9, if the database server 700 creates a virtual database 703, in operation 902 a user specifies criteria for the virtual database 703 as, for example, described in the '586 Application. In operation 904, a user defines a scope of data to be masked by, for example, providing arguments such as particular table names of table objects and column names, security levels, and masking method(s). Since accessing the metadata map 714 by the dynamic data masking system 708 already incurs a performance cost, the creation of the metadata map 714 is, in at least one embodiment, done prior to accepting read requests from the accessing system 712, such as during a configuration process for the virtual database 703.

In operation 906, the dynamic data masking system 708 traverses the database 702/703 to complete creation of the metadata map 714 by referencing the scope of data to be masked, identifying page ID's of data corresponding to the scope, identifying column locations based on the scope and offset data. The dynamic data masking system 708 thereby assigns values to the schema fields of the metadata map 714 that correspond to the scope of data.

For example, if the scope of data to be masked specified that the entirety of patient social security numbers should be masked for level 1 security using a fixed hash (pound) character "#", then dynamic data masking system 708 would traverse database 702/703, scan the page header data 802, and locate all pages that contain patient social security numbers. From the known record structure of each record in the page, the dynamic data masking system 708 can identify the exact location of the social security number in each record of each page. The dynamic data masking system 708 then reads the metadata map 714 and masks the social security number in accordance with the masking method specified in the metadata map 714. By using the dynamic data masking system 708 is able to interpret the structure of each page and record structure and apply appropriate masking such as replacing each nine (9) character social security value with nine (9) hashes # # # # # # # # #.

In at least one embodiment, a virtual database 703 has an immutable set of pages so that the metadata map 714 can be considered to be locked once created. However, in at least one embodiment, the virtual database 703, such as the virtual database described in the '586 Application, allows for the modification of data, to be stored in cache files, which could cause a change in the page identifiers and cause the metadata in metadata map 714 to be out of date. In this embodiment, the virtual database 703 provides, for example, either an original page ID with the data returned from steps 152-162, alongside the retrieved data, or the virtual database 703 implements a mechanism for refreshing the data in the metadata map 714 with the new location of the data in main memory 706. For a generic implementation of database server 700 that does not include a virtual database 703, in at least one embodiment, the dynamic data masking system 708 implements a real-time refresh of the metadata map 714 when adding or updating masked data.

Referring to FIG. 9, in operation 908 the dynamic data masking system 708 stores the metadata map 714. The particular location and method of storing the metadata map 714 is a matter of design choice. In at least one embodiment, the dynamic data masking system 708 packs the metadata map 714 into the virtual database 703 or makes the metadata map 714 available as a reference file.

Figure 10:
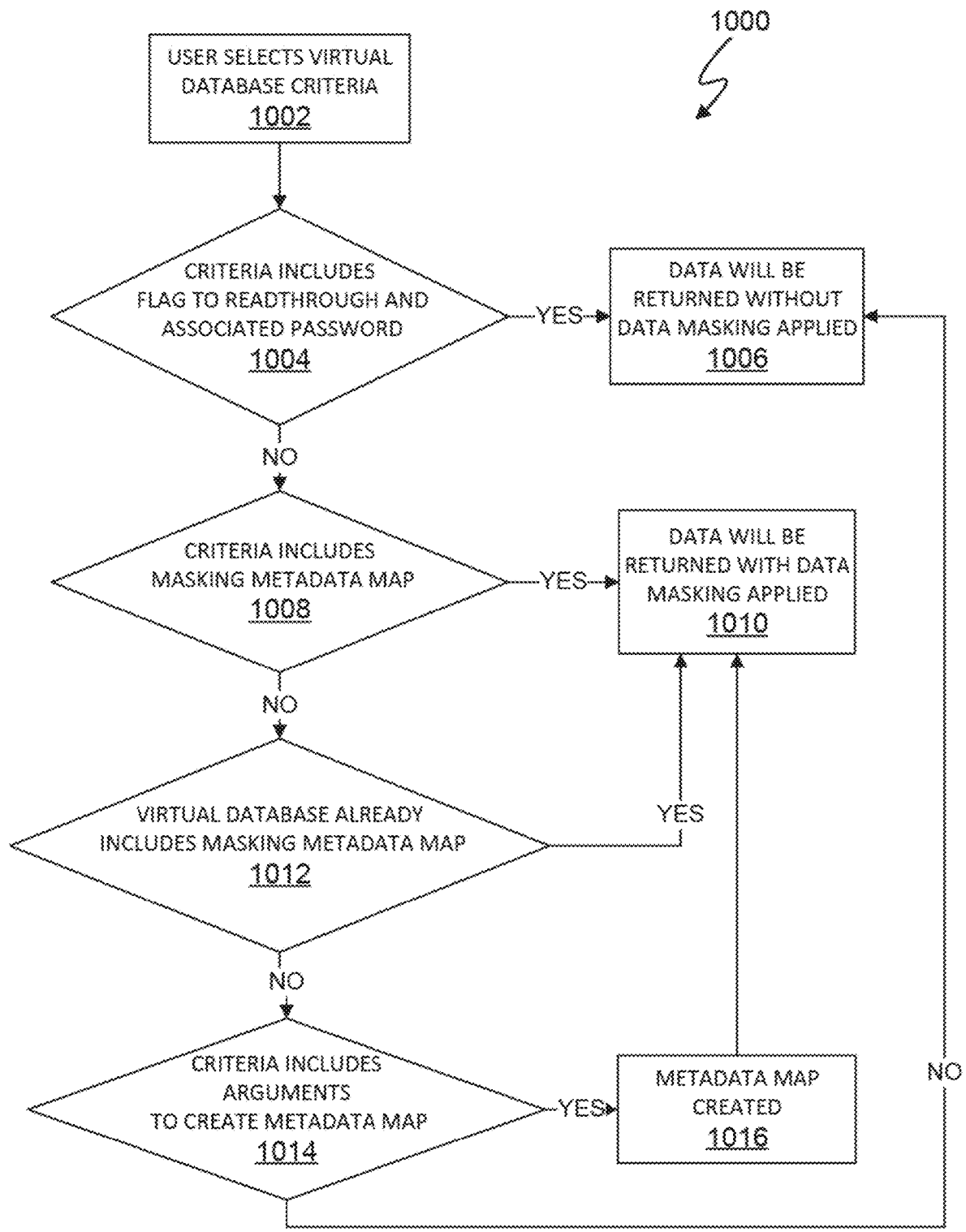
FIG. 10 depicts an initializing and attaching a virtual database with masking criteria.

FIG. 10 depicts an initializing and attaching the virtual database 703 with masking criteria, which is, for example, an addendum to FIG. 4 if the '586 Application. In operation 1002, a user selects criteria for virtual database 703, such as a database name, backup file, PIT, and target instance via console, such as console 34 as described in more detail with reference to, for example, FIG. 4 in the '586 Application. In operation 1004, the dynamic data masking system 708 determines whether the criteria includes a flag to readthrough with an associated password. "Readthrough" indicates that the data in database 702/703 should be read and provided without masking provided a user provides an appropriate password. Thus, in operation 6, if the criteria includes a flag to readthrough and the user of accessing system, then metadata map 714 will not be used. In operation 1008, if the criteria includes the metadata map 1006, in operation 1010 the dynamic data masking system will apply the metadata map 1006 to mask data read from database 702/703. In operation 1012, if the virtual database 703 already includes the masking metadata map 714 when instantiated, then in operation 1010 the dynamic data masking system will apply the metadata map 1006 to mask data read from database 702/703. In operation 1014, if the dynamic data masking system 708 determines that the criteria includes arguments specifying the scope of the metadata map 714, as previously described, then the metadata map 714 is created in accordance with, for example, metadata map creation process 900. Then, the dynamic data masking system 708 returns masked data in operation 1010. If operations 1004, 1008, 1012, and 1014 all evaluate to "NO," then data will be returned without masking in operation 1006.

Figure 11:
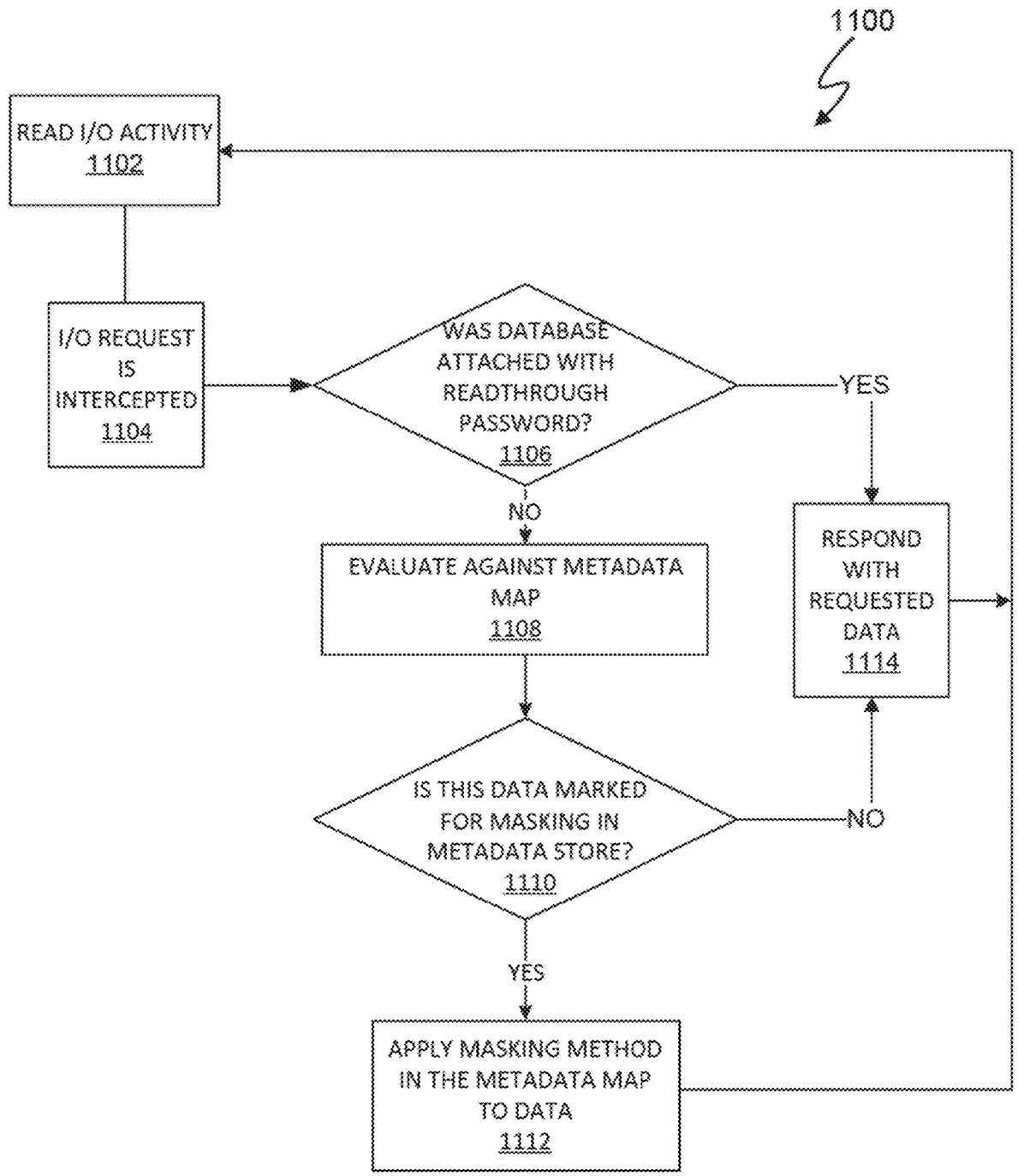
FIG. 11 depicts a dynamic data masking process.

FIG. 11 depicts a dynamic data masking process 1100 that is implemented by database server 700. Referring to FIGS. 7 and 11, in operation 1100 the accessing system 712 sends a data read I/O activity 1102 to the database server 700. In at least one embodiment, the I/O activity is a SQL query read request. In operation 1104, the dynamic data masking system 708 intercepts the read request from input/output 710. In at least one embodiment, the read request is intercepted as described in conjunction with the elements 152-162 of FIG. 7 in the '586 Application. In operation 1106, the dynamic data masking system 708 determines whether the database 702/703 was attached with a readthrough password. If 'yes,' and the user of the access system 712 correctly provided the password, then the database system application 707 responds to the request by copying responsive page(s) 718 to main memory 706, such as a database buffer cache in main memory 706, and providing the requested data to the accessing system 712 in operation 1114. The database server 700 then awaits the next read I/O activity. If operation 1106 evaluates to 'no,' then the dynamic data masking system 708 evaluates the read request against the metadata map 714 in operation 1108. In at least one embodiment, the evaluation in operation 1108 includes a comparison of at least one of (i) a requested page ID and (ii) a page type in the intercepted I/O with page ID's and page types in the metadata map 714 that are identified for masking. If the comparison does not yield a match, then in operation 1110 the database server 700 proceeds in operation 1114 to respond to the request by copying responsive page(s) 718 to main memory 706 and providing the requested data to the accessing system 712. In at least one embodiment, the responsive page(s) 718 are copied to a database reserved portion, such as a database buffer cache, in main memory 706. If the comparison yields a match, then operation 1110 evaluates to 'yes,' and operation 1112, copies the requested data to DDM memory 715, masks the data in accordance with the metadata map 714, and allows the input/output system 710 to copy the page(s) 718 with the masked data into main memory 706.

In applying the masking method, the dynamic data masking system 708 is able to interpret the structure of each page and record structure. By looking up the metadata values from the masking metadata map 714, the dynamic data masking system 708 determines which column values in any individual record structure are subject to masking. For example, if the masked field "Social Security Number" is stored as a fixed character value of 9 characters, those 9 characters will be found in the fixed length column portion 812 of the record structure 804 (FIG. 8). The dynamic data masking system 708 will replace those 9 characters in main memory 706 with characters according to the masking method in the metadata map 714 applicable to the Social Security Number column in the records 804: for example, the string '# # # # # # # # #' may be used. This masking by replacement is done for every masked column in every record 804 in the page 800. Once the replacement is complete, the now-modified page is returned by the database server 700 as the result of a read request.

Figure 12:
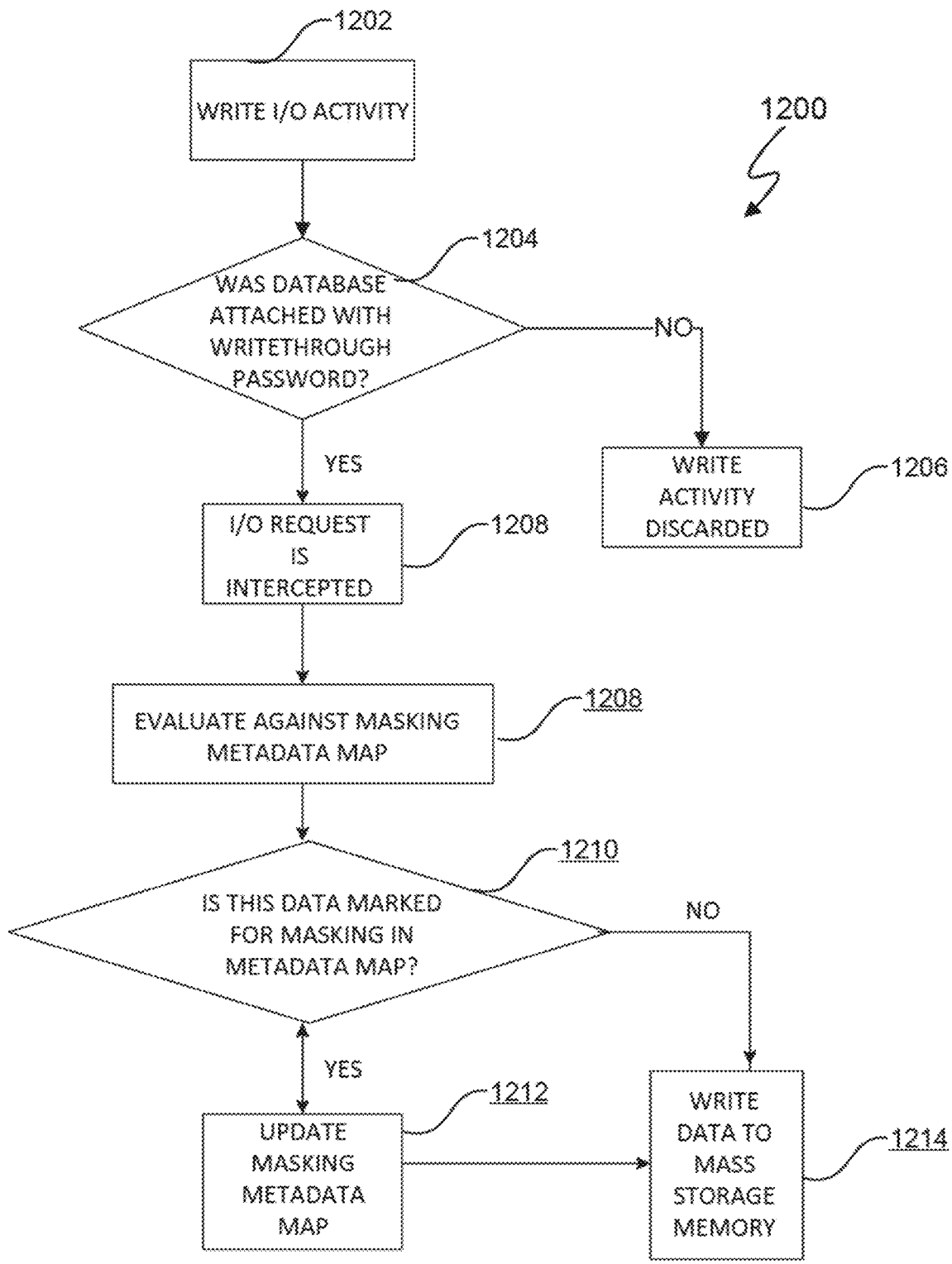
FIG. 12 depicts a data write process.

FIG. 12 depicts a data write process 1200 that writes masked data from main memory 706 to database 702/703. Writing masked data from main memory 706 to database 702/703 should be undertaken with forethought as the masked data may corrupt data in the database 702/703. In at least one embodiment, a user can set a writethrough flag whose value either permits or prohibits the dynamic data masking system 708 from writing masked data from main memory 714 to database 702/703. Use cases exist where corrupting the data in database 702/703 is acceptable. Exemplary use cases for the data write process 1200 are:

A developer wants to test the time it would take to perform an upgrade of database 702/703. The developer attaches to a masked virtual database and runs an upgrade script, which affects both masked and unmasked rows. However, since the data being inserted is test data, its continuing visibility in main memory 714 and a database buffer pool is not a security concern.

A developer wants to test a new index on a table which includes masked data. During index creation, masked data is read from mass storage memory 704 and then re-written to mass storage memory 704 in a new location. The operation will be both logically and physically consistent while the database 702/703 in masked mode. However, if the database 702/703 is subsequently read in an un-masked state, an index which contains masked data would be inconsistent with the underlying table's un-masked data, which would present as corruption.

A user wants to edit a field which is not masked, using a command which does not affect any masked data. Since the data is not masked, the write will complete and the data subsequently be interpreted just as in an un-masked database.

When permitted, data being passed through to write to mass storage 1214 may include data which is masked, data which is not masked, and a combination of the two. In at least one embodiment, the data will be written as delivered to the dynamic data masking system 708, without modification. Where the data being added or updated is subject to masking, the metadata map 714 will be updated to reflect the masking. For example, in at least one embodiment, when an insert or data modification creates one or more new page allocations with a new page ID[range], where "[range]" indicates a range of page ID's representing the number of newly created pages. In at least one embodiment, the current metadata map 714 does not include new page ID[range], so the new dynamic data masking system 708 adds the the new page ID[range] portion of the metadata. The underlying operation whereby a new page is allocated in the metadata map 714, in either an insert or an update, is referred to as a page split. A page split occurs when there is net new data to be added and/or when data to be inserted is too large for the page on which the record either already exists or the page on which the data belongs according to the structure of an index. Users may also perform DDL operations, which are "data definition language" operations, which may change the schema data stored in ObjectName, ColumnName, and ColumnType—for example, a column "LName" with type varchar(10) might be changed to "LastName" with type varchar(20).

Subsequent reads of data from the mass storage memory 704 will be subject to the same masking rules. However, such reads may create a discrepancy between the data which is resident in main memory 706 and the data which would be copied from mass storage memory 704 for the same data page. This may cause physical or logical data corruption and may provide a mechanism for a user to gain access to unmasked data in main memory 706. To address such data corruption and access, in at least one embodiment, the writethrough flag is implemented as previously discussed.

In operation 1202, the accessing system 712 initiates write I/O activity, such as a write request, to write masked data from main memory 706 to database 702/703 in mass storage memory 704. Operation 1204 determines whether a writethrough is permitted. If not, operation 1206 discards the write I/O activity. If operation 1204 determines that a writethrough is permitted, in operation 1208 the dynamic data masking system 708 intercepts the write I/O activity in the same manner as intercepting read I/O activity. Operation 1208 evaluates the data to be written against in the metadata map 714 in the same manner as operation 1108. In operation 1210, if operation 1208 indicates the data is marked for masking, operation 1212 updates the masking metadata map 714, and operation 1214 writes the data to mass storage memory 704. In operation 1210, if operation 1208 indicates the data is not marked for masking, operation 1214 writes the data to mass storage memory 704.

FIG. 13 depicts a table creation progression 1300 of creation a masked table and new index using masked data. The original table 1302 contains original, unmasked data. Masked table 1304 depicts the masking of the Social Security Number column in main memory 706 by dynamic data masking system 708 as previously described. When the masked data is in main memory 706 is written back to mass storage memory 704, the Social Security Number data in table 1306 is now corrupt. The index table 1306 includes columns Social Security Number and Last Name. Indexes, such as index table 1306, are used to improve performance by providing a smaller subset of columns which are ordered to better align with particular usage patterns. But when database system application 707 creates the masked table 1304, based on the masked contents of table 1304, the index table 1306 is corrupt, i.e. the index column Social Security Number contains data which does not correspond to actual values in the underlying table when the data is viewed in an unmasked mode. In this exemplary table there are in fact 3 unique values for the unmasked social security number data, but the index created from masked data reflects only one unique value, # # #-# #-# # # #, which is not correct and, thus represents data corruption.

FIG. 14 depicts tables 1400 with referential integrity issues following a write operation. Relational databases use a concept referred to as referential integrity to maintain relationships among objects in the database structure. The introduction of data masking into a relational structure will undermine referential integrity if data used as a reference is masked, particularly if the masking method generates identical data for multiple rows in the same column.

By way of example, assume that Social Security Number values are used as a key in a primary table to reference a person's gender stored in a foreign table. If the social security number is masked in the primary table but not in the foreign table, referential integrity would be broken. Certain methods of masking would also break integrity, while others, such as hashing, could maintain it, but possibly at the cost of lowered obfuscation of the data set. These considerations would need to be evaluated by the user during configuration. In the primary and foreign pair of tables 1402, the two data tables are linked with a 1:1 relationship on the Social Security Number field. When data is masked in only the primary table in the pair 1404, referential integrity is broken. For the primary table-foreign table pair 1406, when data is masked in a way that does not distinguish between values, referential integrity is still broken as no 1:1 relationship can be derived. In the primary table-foreign table pair 1408, when data is masked in the same fashion using a consistent pattern, relational integrity is maintained. In this example of tables 1408, both values have been replaced with a SHA-3 hash.

Concepts and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the disclosure. It should be understood, however, that the detailed description and the specific examples, while indicating preferred embodiments, are given by way of illustration only and not by way of limitation. Various substitutions, modifications, additions and/or rearrangements within the spirit and/or scope of the underlying concepts will become apparent to those skilled in the art from this disclosure. Embodiments discussed herein can be implemented in suitable computer-executable instructions that may reside on a computer readable medium (e.g., a HD), hardware circuitry or the like, or any combination.

At least portions of the functionalities or processes described herein can be implemented in suitable computer-executable instructions. The computer-executable instructions may be stored as software code components or modules on one or more computer readable media. In one embodiment, the computer-executable instructions may include lines of complied C++, Java, HTML, or any other programming or scripting code.

As used herein, the terms "comprises," "comprising," "includes," "including," "has," "having" or any other variation thereof, are intended to cover a non-exclusive inclusion. For example, a process, process, article, or apparatus that comprises a list of elements is not necessarily limited only those elements but may include other elements not expressly listed or inherent to such process, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such non limiting examples and illustrations includes, but is not limited to: "for example," "for instance," "e.g.," "in one embodiment."

What is claimed is:

1. A method to dynamically enhance data security by masking selected data in transit from a database in a first memory to a second memory using a dynamic data masking system logically coupled between an input/output (I/O) system of a database system application and the database, the method comprising:

with the dynamic data masking system:
intercepting a request from the database system application to read data from the database in the first memory for writing to the second memory;
determining if a portion of requested data should be masked;
when a portion of the requested data is determined to be masked, masking the portion of the requested data determined to be masked; and
providing the requested data with masking to the I/O system; and with the database system application:
copying the requested data with masking to the second memory.

2. The method of claim 1 wherein the second memory comprises main memory, the method further comprising:
  with the dynamic data masking system:
    when a portion of the requested data is determined to be masked, copying each page of data from a database to memory locations controlled by the dynamic data masking system;
    when a portion of the requested data is determined to be masked, masking the portion of the requested data determined to be masked comprises:
      masking the portion of the requested data in each page copied to the memory locations controlled by the dynamic data masking system; and
      providing the requested data with masking to the I/O system comprises:
        providing each page with the masked data to the I/O system, wherein the masking of data is transparent to the database system application.

3. The method of claim 1 wherein the dynamic data masking system preserves the data in the database so that masking the selected data is non-destructive of the data in the database.

4. The method of claim 1 wherein data stored in the database is organized into identifiable pages of data and each page of data includes at least one column of data, the method further comprising:
  determining which portion of the requested data to mask, wherein determining which portion of the requested data to mask comprises:
    comparing the data requested to be read with at least one metadata map of the database, wherein the metadata map includes (i) a mapping of each of the pages that allows each page to be uniquely identified, (ii) one or more data object names, (iii) each data column name of each column to have data masked, (iv) column type for each data column, and (v) a masking method for each column of data to be masked; and
    determining from the comparison if the metadata map indicates that the data requested to be read has any column that should be masked.

5. The method of claim 1 wherein masking the portion of the requested data determined to be masked comprises:
  masking the portion of the requested data in accordance with the masking method included in the metadata map.

6. The method of claim 1 wherein the first memory comprises computer system mass storage memory and the second memory comprises main memory of the computer system.

7. The method of claim 1 wherein the database is a member of a group consisting of a virtual database and a non-virtual database.

8. A system to dynamically enhance data security by masking selected data in transit from a database in a first memory to a second memory, the system comprising:
  a processor;
  a memory, coupled to the processor, having a dynamic data masking system encoded therein, executable by the processor, and logically coupled between an input/output (I/O) system of a database system application and the database to:
    intercept a request from the database application system to read data from the database in the first memory for writing to the second memory;
    determine if a portion of the requested data should be masked;
    when a portion of requested data is determined to be masked, mask the portion of the requested data determined to be masked; and
    provide the requested data with masking to the I/O system; and
  the memory further having the database system application encoded therein and executable by the processor to:
    copy the requested data with masking to the second memory.

9. The system of claim 8 wherein:
  the second memory comprises main memory;
  the dynamic data masking system is further executable to:
    when a portion of the requested data is determined to be masked, copy each page of data from a database to memory locations controlled by the dynamic data masking system;
    when a portion of the requested data is determined to be masked, to mask the portion of the requested data determined to be masked, comprises:
      mask the portion of the requested data in each page copied to the memory locations controlled by the dynamic data masking system; and
  the dynamic data masking system is further executable to:
    provide each page with the masked data to the I/O system, wherein masking of data is transparent to the database system application.

10. The system of claim 8 wherein the dynamic data masking system preserves the data in the database so that masking the selected data is non-destructive of the data in the database.

11. The system of claim 8 wherein data stored in the database is organized into identifiable pages of data and each page of data includes at least one column of data, wherein the dynamic data masking system is further executable to:
  determine which portion of the requested data to mask, and to determine which portion of the requested data to mask comprises:
    compare the data requested to be read with at least one metadata map of the database, wherein the metadata map includes (i) a mapping of each of the pages that allows each page to be uniquely identified, (ii) one or more data object names, (iii) each data column name of each column to have data masked, (iv) column type for each data column, and (v) a masking method for each column of data to be masked; and
    determine from the comparison if the metadata map indicates that the data requested to be read has any column that should be masked.

12. The system of claim 8 wherein to mask the portion of the requested data determined to be masked comprises:
  mask the portion of data in accordance with the masking method included in the metadata map.

13. The system of claim 8 wherein the first memory comprises computer system mass storage memory and the second memory comprises main memory of the computer system.

14. The system of claim 8 wherein the database is a member of a group consisting of a virtual database and a non-virtual database.

15. A non-transitory, computer readable medium comprising a dynamic data masking system and database system application encoded therein, the dynamic data masking system is logically coupled between an input/output (I/O) system of a database system application and a database, to dynamically enhance data security by masking selected data in transit from the database in a first memory to a second memory, the non-transitory, computer readable medium, wherein:

the dynamic data masking system is executable to:
intercept a request from the database application system to read data from the database in the first memory for writing to the second memory;
determine if a portion of the requested data should be masked;
when a portion of the requested data is determined to be masked, mask the portion of the requested data determined to be masked; and
provide the requested data with masking to the I/O system; and the database system application is executable to:
copy the requested data with masking to the second memory.

16. The non-transitory, computer readable medium of claim 8 wherein:
the second memory comprises main memory;
the dynamic data masking system is further executable to:
when a portion of the requested data is determined to be masked, copy each page of data from a database to memory locations controlled by the dynamic data masking system;
when a portion of the requested data is determined to be masked, to mask the portion of the requested data determined to be masked, comprises:
mask the portion of the requested data in each page copied to the memory locations controlled by the dynamic data masking system; and
the dynamic data masking system is further executable to:
provide each page with the masked data to the I/O system, wherein masking of data is transparent to the database system application.

17. The non-transitory, computer readable medium of claim 8 wherein the dynamic data masking system preserves the data in the database so that masking the selected data is non-destructive of the data in the database.

18. The non-transitory, computer readable medium of claim 8 wherein data stored in the database is organized into identifiable pages of data and each page of data includes at least one column of data, and the dynamic data masking system is further executable to:
determine which portion of the requested data to mask, and to determine which portion of the requested data to mask comprises:
compare the data requested to be read with at least one metadata map of the database, wherein the metadata map includes (i) a mapping of each of the pages that allows each page to be uniquely identified, (ii) one or more data object names, (iii) each data column name of each column to have data masked, (iv) column type for each data column, and (v) a masking method for each column of data to be masked; and
determine from the comparison if the metadata map indicates that the data requested to be read has any column that should be masked.

19. The non-transitory, computer readable medium of claim 8 wherein to mask the portion of the requested data determined to be masked comprises:
mask the portion of data in accordance with the masking method included in the metadata map.

20. The non-transitory, computer readable medium of claim 8 wherein the first memory comprises computer system mass storage memory and the second memory comprises main memory of the computer system.

21. The non-transitory, computer readable medium of claim 8 wherein the database is a member of a group consisting of a virtual database and a non-virtual database.

* * * * *